United States Patent
Kamachi

[15] 3,697,761
[45] Oct. 10, 1972

[54] METHOD AND MICROSCOPE FOR DETECTING THE POSITION OF A WORKPIECE

[72] Inventor: Shin-ichi Kamachi, Tokyo, Japan
[73] Assignee: Olympus Optical Co. Ltd.
[22] Filed: March 18, 1971
[21] Appl. No.: 125,800

Related U.S. Application Data

[63] Continuation-in-part of Ser. No. 16,689, March 5, 1970.

[52] U.S. Cl. .............. 250/222 R, 250/202, 250/209
[51] Int. Cl. ............................................... H01j 39/12
[58] Field of Search ....... 250/219 DR, 202, 222, 237, 250/209, 221; 356/152, 172

[56] References Cited

UNITED STATES PATENTS

| | | |
|---|---|---|
| 3,207,904 | 9/1965 | Heinz .................. 356/172 X |
| 3,329,822 | 7/1967 | Rogers .................. 250/209 |
| 3,435,232 | 3/1969 | Sorensen .............. 250/203 R |
| 3,448,280 | 6/1969 | Blitchington, Jr. et al. ........... 250/219 DR X |
| 3,527,953 | 9/1970 | Chitatat ................ 250/202 X |

Primary Examiner—Walter Stolwein
Attorney—Kelman and Berman

[57] ABSTRACT

A photoelectric microscope for detecting the position of the edge portion of a workpiece. The microscope includes an apertured mask having four symmetrically disposed, orthogonal slits in the image plane of the microscope. A pair of photoelectric cells sense the amount of light passing through corresponding pairs of slots. Sum and difference amplifiers connect the outputs of the photoelectric cells to logic circuitry so that the position, orientation and direction of workpiece travel may be uniquely determined.

5 Claims, 12 Drawing Figures

PATENTED OCT 10 1972
3,697,761
SHEET 1 OF 4
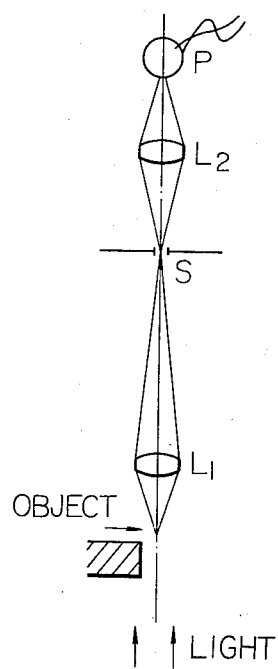
Fig. 1
PRIOR ART
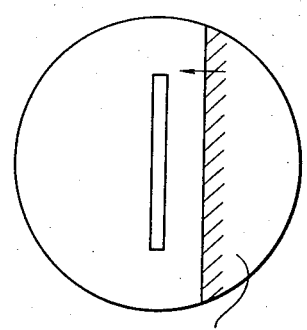
Fig. 2
PRIOR ART
DARK IMAGE
OF OBJECT
Fig. 3
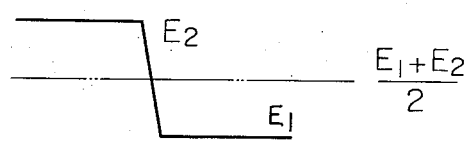
FIELD OF VIEW
OUTPUT OF PHOTOELECTRIC
ELEMENT
Fig. 4
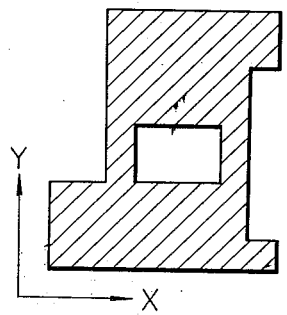
INVENTOR
Shin-ichi Kamachi
BY: Kelman and Betman
agents (a) OUTPUT OF PA (EA.)

(b) OUTPUT OF PB (EB)

(c) SIGNAL OF EA-EB (d) SIGNAL OF EA+EB

INVENTOR
Shin-ichi Kamachi
BY Kelman and Berman
agents

METHOD AND MICROSCOPE FOR DETECTING THE POSITION OF A WORKPIECE

CROSS REFERENCES TO RELATED APPLICATIONS

This is a continuation-in-part of my copending application, Ser. No. 16,689, filed Mar. 5, 1970.

BACKGROUND OF THE INVENTION

1. Field of the Invention

Broadly speaking, this invention relates to optical microscopes. More particularly, in a preferred embodiment, this invention relates to methods and apparatus for photoelectrically detecting the presence of a workpiece in the objective plane of an optical microscope.

2. Discussion of the Prior Art

Photoelectric techniques for detecting the presence of a workpiece in the objective stage of an optical microscope are well known. Typically, such microscopes are provided with a narrow slit in the image plane, and the workpiece is moved across the objective plane in a direction which is perpendicular to the orientation of the slit. A photoelectric cell, and a detector circuit, sense the light which passes through the narrow slit. Thus, as the leading edge of the workpiece passes beneath the slot, light is cut off from the photoelectric cell, thereby signaling the presence of the workpiece.

Obviously, such a technique is reliable only if the edge of the workpiece to be detected is essentially parallel to the major dimension of the slot. Further, since the detector circuit functions by detecting between the presence of light and the absence of light (i.e., dark), a two-state condition, the threshold level of the detector is critical, thereby rendering the detector sensitive to changes in the overall intensity of illumination as well as to changes in the ambient temperature, etc.

SUMMARY OF THE INVENTION

The problem of devising a photoelectric sensing technique, for an optical microscope, which is independent of the orientation of the workpiece to be detected, and which is insensitive to changes in the ambient temperature and to changes in the overall intensity of the lighting, has been solved by the instant invention wherein the position of an edge portion of a workpiece is detected by moving said workpiece across the object plane of an optical microscope having an apertured mask in the image plane thereof, said mask having at least two orthogonally disposed slits therein, and by generating a first electrical signal proportional to the amount of light passing through the first one of said at least two orthogonally disposed slits. Next, a second electrical signal proportional to the amount of light passing through the second one of said at least two orthogonally disposed slits is generated and then a third signal which is proportional to the difference between said first and said second signals is derived, the position of said edge portion being detected, regardless of whether said edge is aligned with the first or with the second one of said at least two orthogonally disposed slits, by detecting the point at which said third signal becomes zero.

DESCRIPTION OF THE DRAWINGS

FIG. 1 is a schematic drawing of a typical prior art microscope;

FIG. 2 is a plan view of the field of view of the microscope shown in FIG. 1;

FIG. 3 depicts the waveform obtained from the microscope of FIG. 1 when a workpiece is detected thereby;

FIG. 4 is a plan view of a typical workpiece having "Manhattan" geometry, i.e., one having orthogonally oriented edge portions;

DETAILED DESCRIPTION OF THE INVENTION

FIG. 1 depicts a typical prior art microscope in which light, from any suitable source, is focused by an objective lens $L_1$ onto an image plane and imaged by a collecting lens $L_2$ upon a photoelectric cell P. A mask (FIG. 2) having a narrow, transparent slot S is positioned in the image plane and serves to block most of the light from the light source. When a workpiece, having an edge portion parallel to the major dimension of the slot S, is moved in a direction which is perpendicular to the major dimension of the slot, the light which succeeds in passing through the slot S to impinge upon photoelectric cell P, is suddenly cut-off.

FIG. 3 illustrates the voltage waveform obtained at the output of photoelectric cell P under these conditions. If $E_2$ represents the voltage from the photoelectric cell under maximum illumination and $E_1$ the voltage under minimum illumination, then the point in time at which the voltage $(E_1 + E_2)/2$ occurs will correspond to the point in time at which the leading edge of the workpiece has just passed over the centerline of the slot S. This point in time can be detected, for example, by connecting the output of photoelectric cell P to a Schmitt trigger whose threshold is set at the voltage corresponding to $(E_1 + E_2)/2$, and then differentiating the output signal therefrom.

As previously discussed, erroneous detection may occur if the leading edge of the workpiece is not exactly parallel to the major dimension of the slot. Further, if the amplitude of the light source should vary, $E_2$ (but not $E_1$) will also vary, causing premature, or tardy, detection of the workpiece. Additionally, the threshold level of the Schmitt trigger is sensitive to temperature changes in the electronic circuitry, and to the effects of component aging, etc.

Figure 5:
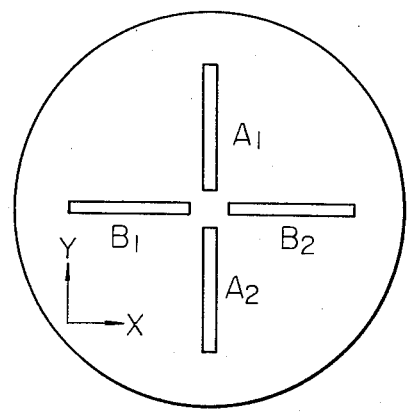
FIG. 5 is a plan view of an illustrative microscope slit arrangement, according to the invention.

According to the present invention, workpieces, such as shown in FIG. 4, may be detected without the need for time-consuming orientation procedures, by employing a multi-slotted mask as shown in FIG. 5. The mask of FIG. 5 comprises two pairs of orthogonally oriented slots $A_1$, $A_2$ and $B_1$, $B_2$, respectively. Advantageously, the slots $A_1$, $A_2$ and $B_1$, $B_2$ are symmetrically disposed about the center of the mask and, in the illustrative example, slots $A_1$, $A_2$ are parallel to the y-axis, while slots $B_1$, $B_2$ are parallel to the x-axis.

One skilled in the art will appreciate that other orientations and slot arrangements are possible; for example, the slots may be disposed about the 45° axis. Also, each slot could comprise a plurality of smaller slots or apertures, without departing from the teachings of this invention.

Figure 6:
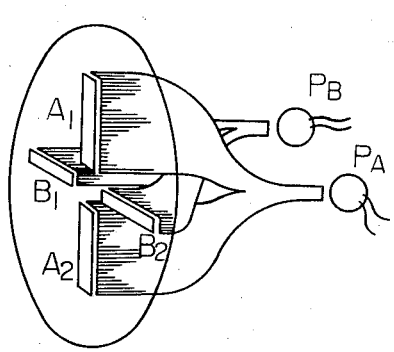
FIG. 6 is a schematic, fragmentary, perspective view of an optical system utilizing the slit arrangement of FIG. 5.

As shown in FIG. 6, one photoelectric cell is provided for each pair of slots; thus, a first photoelectric cell $P_A$ detects the presence of light in slots $A_1$ and $A_2$, while a second photoelectric cell $P_B$ detects the presence of light in slots $B_1$ and $B_2$. In FIG. 6, each photoelectric cell is shown as being connected to its associated slots by optical fibers; however, other known optical devices, such as lens, mirrors and prisms could also be employed. The important point to be observed is that cell $P_A$ must only receive illumination from slots $A_1$ and $A_2$ and not from slots $B_1$ and $B_2$, and similarly, cell $P_B$ must only receive illumination from slots $B_1$ and $B_2$.

Alternatively, four photoelectric cells could be provided, one for each slot, with the output signals from corresponding pairs of cells being electrically summed, in a well known manner. Advantageously, in either arrangement, the photoelectric cells should be closely matched for output characteristics.

Figure 7:
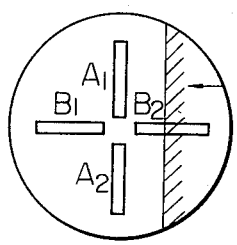
FIG. 7 is a plan view of the slit arrangement of FIGS. 5 and 6 depicting a workpiece having an edge portion parallel to a first pair of slots in the slot system, and traversing the field of view in a direction parallel to a second pair of slots therein.

FIG. 7 illustrates an opaque workpiece, having an edge portion parallel to slots $A_1$, $A_2$, traversing the filed of view, in a direction, from right to left, that is to say a direction of travel which is perpendicular to slots $A_1$, $A_2$ but parallel to slots $B_1$ and $B_2$.

Figure 8:
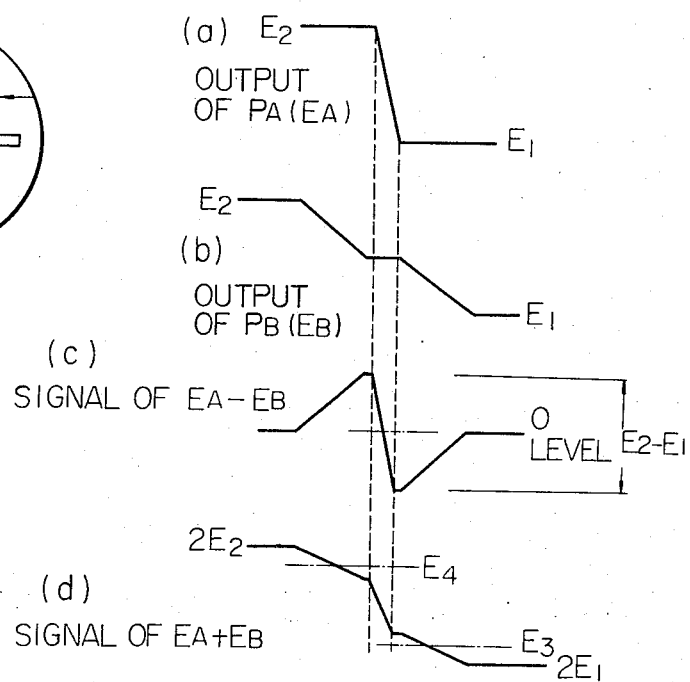
FIG. 8 depicts the various waveforms obtained in a microscope system according to this invention for the situation shown in FIG. 7.

The electrical waveforms which result from such a workpiece configuration and direction of travel are shown in FIG. 8. Waveform $a$ represents the output signal from photoelectric cell $P_A$. Voltages $E_2$ and $E_1$ correspond to the situation where the photoelectric cell receives maximum illumination and minimum illumination, respectively.

In a similar manner, waveform $b$ represents the output signal from photoelectric cell $P_B$. Again, voltages $E_2$ and $E_1$ represent maximum illumination and minimum illumination, respectively.

Figure 11:
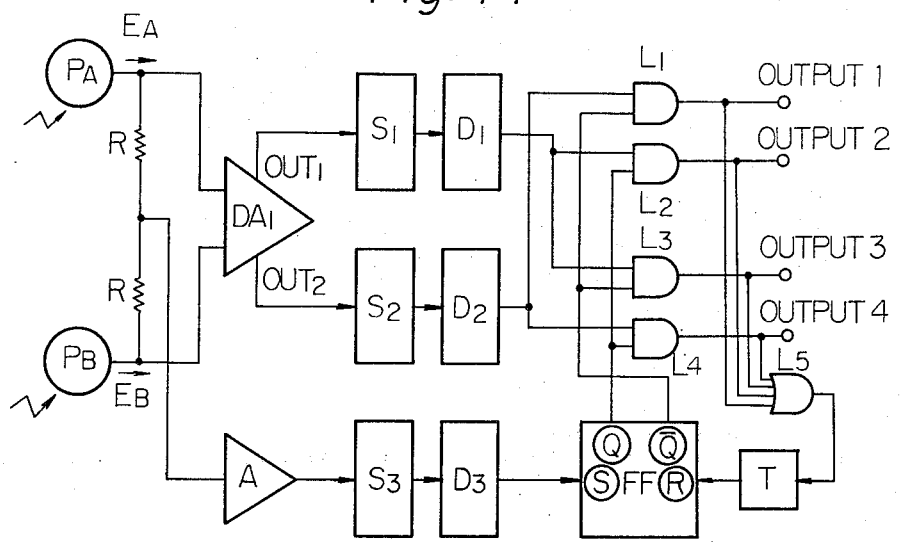
FIG. 11 is a block diagram of an illustrative detector circuit for use with the present invention.

Referring momentarily to FIG. 11, if the output signal from photoelectric cell $P_A$ ($E_A$) is subtracted from the output of photoelectric cell $P_B$ ($E_B$), for example, by means of differential amplifier $DA_1$, the waveform $c$ in FIG. 8 is obtained. Visual inspection of the above waveforms reveals that the edge portion of the workpiece will lie exactly over the longitudinal center line of slots $A_1$ and $A_2$ when the difference signal ($E_1 - E_B$) falls to zero.

Waveform $d$ illustrates the addition of signals $E_A$ and $E_B$. As can readily be seen, the amplitude of waveform $d$ falls from a maximum of $2E_2$ to a minimum of $2E_1$.

It will be noted that the magnitude of the difference signal ($E_A - E_B$) is independent of the intensity of the illumination. Further, by appropriate design of the difference amplifier, changes in circuit performance due to changes in the ambient temperature may also be minimized. Therefore, according to this invention, a very high degree of accuracy can be attained in detecting the edge portion of a workpiece.

It will be self-evident that if the workpiece is traveling from left to right so as to clear slots $A_1$, $A_2$; $B_1$, $B_2$, the waveforms $E_A$, $E_B$, ($E_A - E_B$) and ($E_A + E_B$), will vary inversely from those shown in FIG. 8. Thus, when the difference signal ($E_A - E_B$) rises to zero, at the same time that the signal ($E_A + E_B$) is rising, the trailing edge of the workpiece must coincide with the longitudinal center line of slots $A_1$ and $A_2$.

Figure 9:
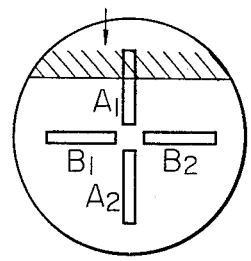
FIG. 9 is a plan view, similar to that shown in FIG. 7, but with the direction of workpiece travel rotated by 90°.
Figure 10:
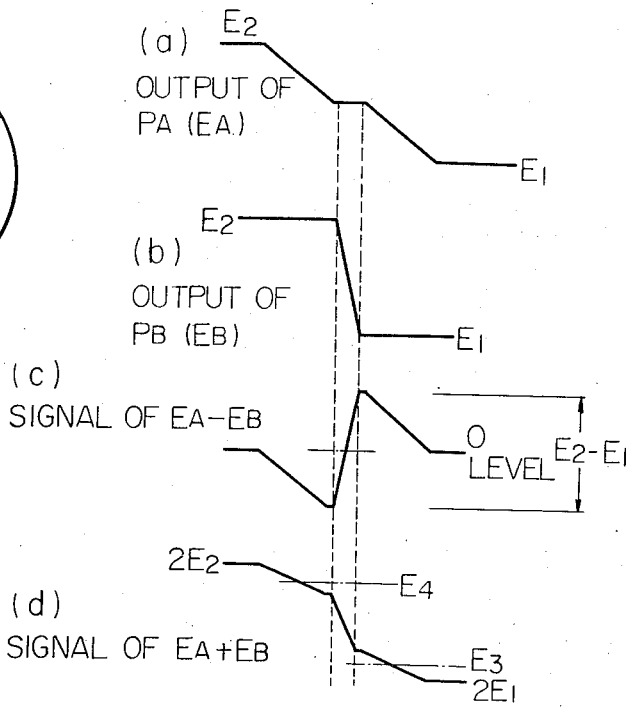
FIG. 10 depicts the waveforms corresponding to the situation shown in FIG. 9.

FIG. 9 presents the situation where the edge portion of thw workpiece is parallel to the slots $B_1$, $B_2$ and the direction of workpiece travel is parallel to slots $A_1$, $A_2$. FIG. 10 illustrates the waveforms which will be obtained under these circumstances. Once again, if the workpiece is moved upwardly to clear slots $A_1$, $A_2$; $B_1$, $B_2$ the waveforms obtained will vary inversely from those shown in FIG. 10.

It will be thus self-evident that if the condition is detected where the difference signal ($E_A - E_B$) is rising to zero while the sum signal ($E_A + E_B$) is falling, this can only mean that a workpiece having an edge portion parallel to slots $B_1$, $B_2$ is moving in a direction to cover slots $A_1$, $A_2$; $B_1$, $B_2$ and is located along the longitudinal center line of slots $A_1$, $A_2$.

Similarly, if ($E_A - E_B$) is falling to zero while ($E_A + E_B$) is rising, it can only mean that the workpiece is moving upwardly in a direction to clear slots $A_1$, $A_2$; $B_1$, $B_2$.

Thus, with the present invention, the position of the edge portion of a workpiece extending along either the x or the y-axis can easily be detected, as well as the direction of travel and a determination as to whether the edge portion is a leading edge or a trailing edge. More importantly, all of the above information can be detected without the necessity of a time-consuming orientation operation between the workpiece and the scanning slots.

The above is summarized in the following truth table.

TABLE A

| Sense of Workpiece Motion | Motion Along X-Axis | Motion Along Y-Axis |
| --- | --- | --- |
| In a Direction to Cover the Slits | ($E_A - E_B$) Falling | ($E_A - E_B$) Rising |
|  | ($E_A + E_B$) Falling | ($E_A + E_B$) Falling |
| In a Direction to Uncover the Slits | ($E_A - E_B$) Rising | ($E_A - E_B$) Falling |
|  | ($E_A + E_B$) Rising | ($E_A + E_B$) Rising |

FIG. 11 illustrates a circuit configuration which will detect the various voltage combinations listed in the above table, and yield an output signal indicative of the position, direction of travel and orientation of the workpiece.

As shown, the output signals from photocells $P_A$ and $P_B$ are connected to a pair of summing resistors R and to the inputs of a differential amplifier $DA_1$.

The differential amplifier $DA_1$ has a first output $OUT_1$ which is proportional to the magnitude of the difference between the output of photocells $P_A$ and $P_B$, that is to $(E_A - E_B)$. Similarly, the differential amplifier has a second output $OUT_2$ which is the inverse of $OUT_1$, that is, an output which is proportional to the signal $-(E_A - E_B)$ or $(E_B - E_A)$.

The output signals $OUT_1$ and $OUT_2$ from differential amplifier $DA_1$ are connected to a first and a second Schmitt trigger circuit $S_1$ and $S_2$, respectively. Both Schmitt trigger circuits are arranged to furnish an output which goes positive when the input signal thereto approaches zero from some negative value (i.e., a rising input). Similarly, the two trigger circuits $S_1$, $S_2$ are arranged to furnish an output which goes negative when the input signal thereto approaches zero from some positive level (i.e., a falling input). The outputs from Schmitt trigger circuits $S_1$ and $S_2$ are connected to a pair of differentiating circuits $D_1$ and $D_2$, respectively; each of which generates an output pulse when a rising signal is applied thereto.

The midpoint of the summing resistors R is connected to the input of a summing amplifier A, thence to a third Schmitt trigger and differentiating circuit $S_3$ and $D_3$, respectively. Schmidt trigger circuit $S_3$ is adjusted to produce an output signal which becomes positive when the input signal thereto exceeds some level $E_3$ (FIGS. 8d, 10d) from below (i.e., a rising signal). As before, the differentiating circuit $D_3$ produces an output pulse upon receipt of a rising input.

The output of differentiating circuit $D_3$ is connected to the set input S of a flip-flop circuit FF comprising a bistable multivibrator having a pair of complementary outputs Q and $\bar{Q}$. In a well known manner, when a triggering pulse is applied to the set input S, the Q output will go high and the $\bar{Q}$ output will go low. Conversely, when the reset input R is energized, the $\bar{Q}$ output will switch from low to high and the Q output will switch from high to low.

The output of differentiating circuit $D_1$ is connected to one input of a pair of AND-gates $L_2$ and $L_3$, while the output of differentiating circuit $D_2$ is connected to one input of another pair of AND-gates $L_1$ and $L_4$. The Q output of flip-flop FF is connected to the other input of gates $L_2$ and $L_4$, while the complementary output $\bar{Q}$ is connected to the other inputs of gates $L_1$ and $L_3$.

The outputs of AND-gates $L_1$–$L_4$ are, in turn, connected to the input of an OR-gate $L_5$, thence, via a delay circuit T, to the reset terminal R of flip-flop FF.

Figure 12:
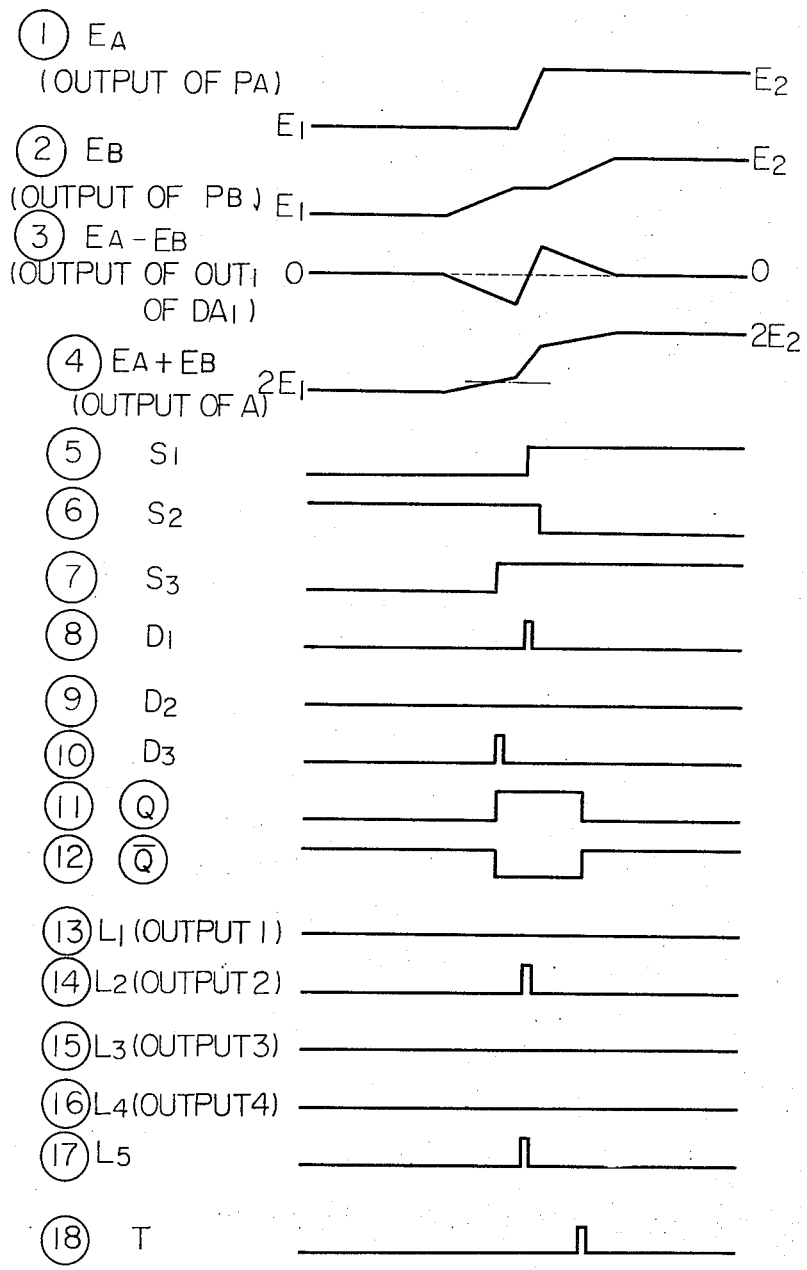
FIG. 12 illustrates the various waveforms obtained with the detector circuit of FIG. 11.

The operation of the above-described apparatus will now be described with reference to FIG. 12, which represents the various waveforms found in the circuit of FIG. 11.

Assume that the workpiece to be detected is oriented such that the edge portion is parallel to the y-axis and that the direction of relative motion is parallel to the x-axis. Assume, further, that the object is moving from a position where all slots are fully blocked to a position where all slots are uncovered. Thus, the outputs from photoelectric cells $P_A$ and $P_B$ will be as shown in waveforms (1) and (2). Similarly, the output $OUT_1$ of differential amplifier $DA_1$, which is proportional to $(E_A - E_B)$, and the output of summing amplifier A, which is proportional to $(E_A + E_B)$, will be represented by waveforms (2) and (3), respectively. The output $OUT_2$ from $DA_1$ is, of course, the inverse of waveform (3).

Thus, the outputs from Schmitt triggers $S_1$, $S_2$ and $S_3$ will be as shown in waveforms (5), (6) and (7), respectively. Since only waveforms (5) and (7) have a positive-going step, only differentiating circuits $D_1$ and $D_3$ will generate an output pulse, as shown in waveforms (8) – (10). The output pulse from differentiating circuit $D_3$ will set flip-flop FF, in turn causing a high output at terminal Q [waveform (11)] and a low output at terminal $\bar{Q}$ [waveform (12)]. The high Q output enables AND-gates $L_2$ and $L_4$, but since only circuit $D_1$ has produced an output pulse, only AND-gate $L_1$ will be actuated, as shown in waveforms (13) – (16), inclusive.

$L_2$, energized, in turn actuates OR-gate $L_5$ and generates a delayed pulse through delay circuit T, as shown in waveforms (17) and (18). The delayed pulse from circuit T resets the flip-flop and the outputs Q and $\bar{Q}$ return to their original condition.

By reference to the above-described truth table, the detection of an output from AND-gate $L_2$ indicates that the workpiece is aligned such that the edge to be detected is parallel to the y-axis, and that the direction of travel is parallel to the x-axis, as was originally assumed. The fact that the slots are initially covered and become uncovered as the workpiece moves is also uniquely determined. Of course, the moment that AND-gate $L_2$ becomes actuated corresponds to the exact moment in time when the edge portion of the workpiece is aligned with the longitudinal axis of the slots $A_1$, $A_2$.

In a similar manner, all possible combinations of orientation, direction of motion and status can be readily detected. More specifically, by direct analogy, when $L_1$ is actuated, the workpiece edge is parallel to the y-axis and moving to cover the slots, when $L_3$ is actuated, the workpiece edge is parallel to the x-axis and moving to cover the slots, while when $L_4$ is actuated, the workpiece is moving to uncover the slots.

Flip-flop FF may be replaced by yet another Schmidt trigger circuit which is arranged to yield a negative output when the input signal reaches $E_4$ (FIGS. 8d, 10d) and a positive output when the input signal reaches $E_3$ (FIGS. 8d, 10d). One skilled in the art could make various other changes in the layout of parts and in the detection circuitry without departing from the spirit and scope of the invention.

What is claimed is:

1. A method of detecting the position of an edge portion of a workpiece, comprising the steps of:
    moving said workpiece across the object plane of an optical microscope having an apertured mask in the image plane thereof, said mask having at least two orthogonally disposed slits therein;
    generating a first electrical signal proportional to the amount of light passing through the first one of said at least two orthogonally disposed slits;

generating a second electrical signal proportional to the amount of light passing through the second one of said at least two orthogonally disposed slits;

deriving a third signal which is proportional to the difference between said first and said second signals; and detecting the point at which said third signal becomes zero, whereby the position of said edge portion is detected, regardless of whether said edge is aligned with the first or with the second one of said at least two orthogonally disposed slits.

2. The method according to claim 1, comprising the further steps of:

deriving a fourth electrical signal which is proportional to the sum of said first and said second signals;

determining the sign of the slope of said third signal as said signal passes through zero;

determining the sign of the slope of said fourth signal as said signal passes through zero; and comparing the respective signs of the slopes of said third and said fourth signals whereby the position, orientation and direction of travel of said workpiece is uniquely determined.

3. A photoelectric microscope for detecting the position of an edge portion of a workpiece in the object plane thereof, comprising:

an objective lens;
an imaging lens;
means for illuminating said workpiece;
an apertured mask in the image plane of said microscope, said mask having at least two orthogonally oriented slits therein;
first photoelectric means for generating a first signal proportional to the amount of light passing through a first one of said at least two slots;
second photoelectric means for generating a second signal proportional to the amount of light passing through a second one of said at least two slots;
a differential amplifier connected to said first and second photoelectric means for receiving said first and second signals and deriving a first output signal which is proportional to the difference therebetween; and
means, connected to the output of said differential amplifier, for generating an output pulse when the amplitude of said first output signal passes through zero, whereby the position of said edge portion is detected, regardless of whether said edge portion is aligned with said first or said second slits.

4. A photoelectric microscope according to claim 3, wherein said differential amplifier derives a second output signal proportional to the difference between said second and said first signals;

said generating means comprising a first detecting circuit for detecting when said first output passes through zero and a first differentiating circuit connected to the output of said first detecting circuit, for generating said output pulse; and said microscope further comprises:

means, connected to the output of said first and second photoelectric means, for summing said first and second signals;

a second detecting circuit and a second differentiating circuit connected to the second output of said differential amplifier for generating an output pulse when said second output signal passes through zero;

a bistable multivibrator having first and second complementary outputs and a setting input;

a third detecting circuit and a third differentiating circuit, connected to the output of said summing means, for generating an output pulse when the amplitude of said summed signal passes through a predetermined voltage level, said output pulse being applied to the setting input of said multivibrator; and logic circuitry, comprising at least four AND-gates, the inputs to said AND-gates representing every possible permutation of the complementary outputs of said multivibrator and the outputs of said first and second differentiating circuits, whereby said logic circuitry produces an output signal uniquely determining the position, orientation and direction of travel of said workpiece in said objective plane.

5. The microscope according to claim 4 further comprising:

an OR-gate connected to the outputs of said at least four AND-gates; and a delay circuit interconnecting the output of said OR-gate and the reset terminal of said multivibrator, whereby said multivibrator is reset at the end of each cycle of operation.

* * * * *

UNITED STATES PATENT OFFICE
CERTIFICATE OF CORRECTION

Patent No. 3,697,761           Dated October 10, 1972

Inventor(s) Shin-ichi Kamachi

It is certified that error appears in the above-identified patent and that said Letters Patent are hereby corrected as shown below:

In the title page, after line /21/ insert --

/30/   Foreign Application Priority Data

March 11, 1969, Japan .............. 18016/1969

Signed and sealed this 13th day of February 1973.

(SEAL)
Attest:

EDWARD M. FLETCHER, JR.              ROBERT GOTTSCHALK
Attesting Officer                    Commissioner of Patents

FORM PO-1050 (10-69)